United States Patent [19]

Falcomato

[11] Patent Number: 4,608,107
[45] Date of Patent: Aug. 26, 1986

[54] HIGH TEMPERATURE PROBE LANCE COVER

[75] Inventor: Rocco Falcomato, Brooklyn, N.Y.

[73] Assignee: Niemand Bros. Inc., Elmhurst, N.Y.

[21] Appl. No.: 669,050

[22] Filed: Nov. 6, 1984

Related U.S. Application Data

[63] Continuation of Ser. No. 491,409, May 4, 1983, abandoned.

[51] Int. Cl.[4] .............................................. C21C 7/00
[52] U.S. Cl. ...................................... 156/190; 156/195
[58] Field of Search .......................... 156/195, 184–185, 156/187–188, 425, 428–432, 173, 171; 138/144–145

[56] References Cited

U.S. PATENT DOCUMENTS

| | | | |
|---|---|---|---|
| 2,308,473 | 1/1943 | Wadman et al. | 138/141 |
| 3,264,874 | 8/1966 | Fisher | 136/234 X |
| 3,430,940 | 3/1969 | Criss | 138/144 X |
| 3,816,183 | 6/1974 | Kraus | 136/234 |
| 3,861,881 | 1/1975 | Nowak | 138/108 X |
| 3,989,342 | 11/1976 | Fisher et al. | 339/60 R X |
| 4,093,193 | 6/1978 | Cassidy et al. | 156/190 X |
| 4,135,538 | 1/1979 | Kurita | 136/234 |

FOREIGN PATENT DOCUMENTS

| | | | |
|---|---|---|---|
| 956324 | 4/1964 | United Kingdom | 136/234 |
| 1102964 | 2/1968 | United Kingdom | 152/195 |

Primary Examiner—David Simmons
Attorney, Agent, or Firm—Kane, Dalsimer, Kane, Sullivan and Kurucz

[57] ABSTRACT

High temperature resistant tubes are described, which are useful as heat insulators for thermocouples. The tubes are made of spirally wound, refractory cements reinforced with non-woven webs of ceramic fibers. The tubes are advantageous in that by the method of their manufacture, they are free of significant proportions of organic binders and adhesives which may be volatilized at high temperatures, releasing gases.

1 Claim, 3 Drawing Figures

HIGH TEMPERATURE PROBE LANCE COVER

This is a continuation of copending application Ser. No. 491,409 filed on May 4, 1984 now abandoned.

BACKGROUND OF THE INVENTION

1. Field of the Invention

The invention relates to high temperature resistant tubes, useful as protective devices and more particularly relates to tubular ceramic heat insulators and methods of their manufacture.

2. Brief Description of the Prior Art

Representative of prior art descriptions is that found in the U.S. Pat. No. 4,093,193. The present invention constitutes an improvement over the prior art tubular ceramic heat insulators in that their construction does not include significant proportions of organic binders or adhesives. The absence of substantial amounts of these volatile components is a particular advantage in many applications. For example, as sacrificial covers for immersion thermocouples, the absence of substantial amounts of volatile organic materials obviates generation and release of gaseous contaminants in molten materials undergoing temperature measurements.

SUMMARY OF THE INVENTION

The invention comprises a high temperature resistant tube, which comprises;
- a rigid core of a spirally wound tube of refractory cement, reinforced with a non-woven web of ceramic fibers; and
- inner and outer covering layers sandwiching said core, said layers being of a protective material;
- said tube being free of significant proportions of organic binders or adhesives.

The invention also comprises the method of making tubes of the invention.

DETAILED DESCRIPTION OF THE PREFERRED EMBODIMENTS OF THE INVENTION

Figure 1:
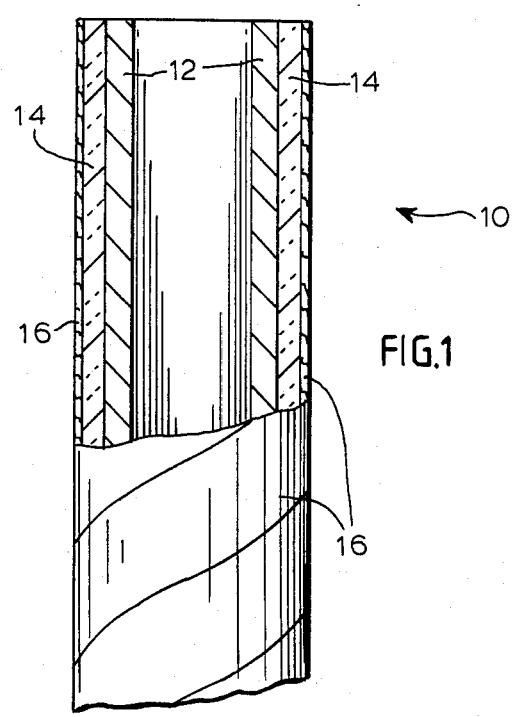
FIG. 1 is a cross-section-in-part of a portion of an embodiment tube of the invention.

FIG. 1 is a cross-section-in-part of a preferred embodiment tube 10 of the invention and comprises an inner layer 12 and an outer layer 16 of protective material sandwiching a core 14 of refractory cement reinforced with a non-woven web of ceramic fibers. The tube 10 is substantially free of organic binders or adhesive materials which would be subject to volatilization upon immersion in high-temperature melts of metals, chemical compounds and the like. Bubbles formed in the melt by such volatilization are generally to be avoided.

The tube 10 has a variety of uses. For example, tube 10 may be used as part of an expendable non-splash thermocouple lance. In that regard, typical dimensions for tube 10 would be an ID of about 0.7 inches, an OD of about 1⅛ inches, a radial wall thickness of the inner core 12 of about 0.1 inches, a radial wall thickness of the intermediate zone 14 of about 0.1 inches, with the outer wrap 16 having a thickness of about 0.003 inches. Tube 10 is made in various lengths from 6 to 48 inches.

The layers 12, 16 preferably may be of any flameresistant material such as, for example metallic foil, fabrics of high-temperature resistant, flame resistant materials such as polyaramid fiber fabrics and the like. Light weight cellulosic materials such as thin paper may also be used. The layers 12, 16 are only protective layers for the core 14 and they may be formed by spiral winding using known techniques of spiral winding.

Figure 2:
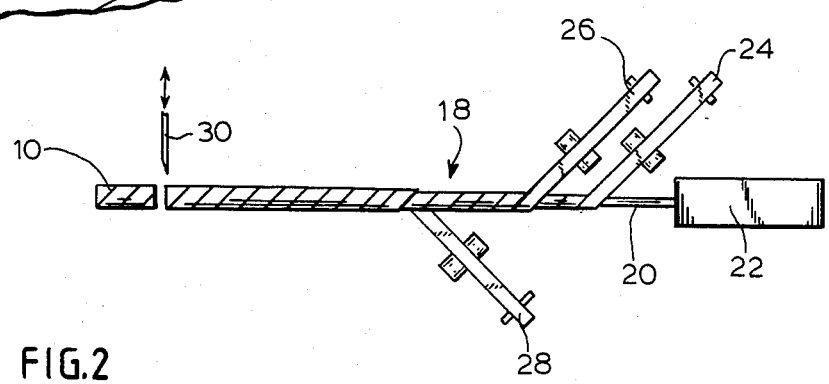
FIG. 2 is a schematic view of apparatus used in the method of the invention.

Referring now to FIG. 2, the method of the invention for preparing the tubes of the invention will be described. In FIG. 2, there is diagrammatically illustrated a spiral tube machine 18. The machine 18 may be made in accordance with any one of a variety of commercially available equipment or in connection with the teachings of U.S. Pat. Nos. 2,623,443; 3,044,372 or 3,317,109. A typical spiral tube machine 18 includes a mandrel 20 which is continuously rotated in one direction by a motor 22. The mandrel 20 is unsupported at the end remote from the motor 22.

Referring to FIG. 2, a narrow web of material such as a fabric of polyaramid yarns used for the layer 12 is unwound from a roll 24 and then wrapped around the mandrel 20. A narrow web of ceramic paper is unwound from the roll 26, coated on both surfaces with a refractory cement and then spirally wrapped in the same direction around the layer 12 while it is disposed on the mandrel 20. A narrow web of aluminum foil or the like, is unwound from roll 28 and then spirally wound in the same direction around the core 14. In this manner, a spirally wound tube 10 is continuously made and cut to unit lengths by flying cutter 30. Each of the narrow widths of material on the rolls 24, 26 and 28 is between 1⅝ and 2 inches wide.

As used herein, "ceramic paper" refers to paper made from ceramic or refractory fibers in the form of a nonwoven sheet by a Fourdrinier machine. Ceramic papers are available commercially and typically examples are sold under the trademarks FIBERFRAX, KAOWOOL. The preferred ceramic paper has a white color, has a continuous temperature limit use of 2300° F., a melting point of approximately 3300° F., fiber diameters of 2 to 3 microns, fiber length up to 1 inch, a density of 10 to 12 pounds per cubic foot, thermal conductivity of about 1.4 BTU-in./hr.Ft.$^2$° F. at 2000° F., a specific gravity of 2.53 grams per cubic centimeter. The preferred ceramic paper having a rated thickness (measured at 8 psi compression in accordance with Tappi method T-411m44) of 0.040 inches weighs 0.053 pounds per square foot.

Figure 3:
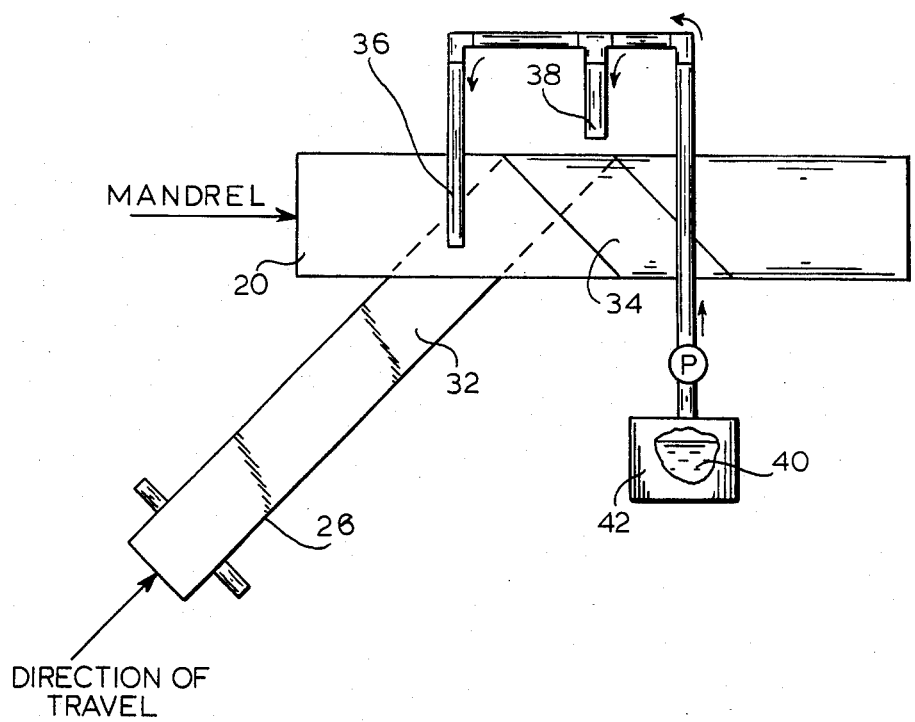
FIG. 3 is also a schematic view of apparatus used in the method of the invention.

The ceramic paper described above is employed as a reinforcing means for the refractory cement. Ceramic paper is a fibrous material composed of a plurality of discrete ceramic fibers disposed in a sheet configuration with many voids between the fibers. In the process of the invention, the paper is coated filling the voids between the fibers with the refractory cement and anchoring the surface coatings of the same cement. FIG. 3 is a schematic drawing showing in further detail the process shown in FIG. 2. The web of ceramic paper unwound from roll 26 and onto the mandrel 20 receives a first coating on surface 32 of a liquid refractory cement forming material 40 pumped from container 42 through applicator 36. As the paper is spirally wrapped in the form of the tube 10 and core 14, the surface 34 opposite surface 32 appears by inversion of the paper and receives also a coating of the cement forming material 40 through applicator 38. In this way, a layer of liquid, refractory cement forming composition reinforced with a web of non-woven, ceramic paper is cast on the inner layer 12 and is ready to receive the outer layer 16, also spirally wrapped over the cement layer 14.

There is an important advantage obtained by the method of the invention wherein the refractory cement forming composition is applied to the ceramic paper almost simultaneously with the spiral winding operation and while the ceramic paper is at least partially supported by the mandrel. If one first impregnates the ceramic paper with the cement forming composition, the impregnated paper is difficult to handle without damage to the ceramic paper structure. The paper structure is fragile and readily damaged when wet with the cement forming composition. On the other hand, if the tube is first formed by spiral wrapping and then dipped in the cement forming composition, it is difficult to obtain a homogeneous penetration of the ceramic paper. Application of the cement forming composition as the tube of the invention is being formed on the winding mandrel obviates these problems.

The liquid, refractory cement forming composition is advantageously an aqueous colloidal suspension of silica. Preferably, the silica will have an average particle size of from 10-30 mu and will comprise from 15 to 30 percent by weight of the aqueous suspension. Following construction of the tube 10 as described above, the core 14 of refractory cement forming composition is dried to obtain a rigid, ceramic fiber reinforced refractory cement layer or core 14. This is achieved without the need for substantial amounts of organic binders or adhesives. The aqueous colloidal silica penetrates the void spaces in the ceramic paper, without a need to immerse the paper in the silica suspension, a procedure which has proven to be difficult, resulting in torn paper.

What is claimed:

1. A method of contionusly fabricating high-temperture resistant tubes, which comprises;

forming on a mandrel a spirally wound tube of a protecting base of a high-temperature resistant, flame resistant material;

providing a web of ceramic paper having inner and outer surfaces, said paper being a fibrous material composed of a plurality of discrete ceramic fibers dispersed in the web configuration with a plurality of voids between the fibers;

coating said inner surface of the web with a liquid refractory cement forming composition consisting essentially of an aqueous colloidal suspension of silica; said silica having an average particle size of from 10-30 mv an comprising from 15 to 30 percent by weight of the aqueous suspension;

winding said web with the coated inner surface spirally over said wound tube while the wound tube is on the mandrel, in the same direction as the winding of the protective base with the coated inner surface disposed on the protective base;

coating the outer surface of the wound web of ceramic paper with said liquid refractory cement forming composition while it is winding on the protective base and the ceramic paper is supported on the mandrel;

whereby the coating of the inner surface and the coating of the outer surface penetrate and fill the voids between the fibers of the paper and anchor together the coatings of the inner and the outer surfaces;

covering the coated ceramic paper spirally wound on the mandrel over the spirally wound protective base with a protective covering of a high-temperature resistant, flame-resistant material by spirally winding the protective covering over the coated web of ceramic paper;

whereby there is obtained a tube structure;

drying the structure, whereby the refractory cement forming composition is converted to a rigid, reinforced, refractory cement, and cutting the continuous fabrication into pre-determined lengths of high-temperature resistant tubes.

* * * * *